(12) United States Patent
Shen et al.

(10) Patent No.: US 11,036,388 B2
(45) Date of Patent: *Jun. 15, 2021

(54) SENSOR DEVICE SCANNING TECHNIQUES TO DETERMINE FAST AND/OR SLOW MOTIONS

(71) Applicant: Synaptics Incorporated, San Jose, CA (US)

(72) Inventors: Guozhong Shen, San Jose, CA (US); Ozan Ersan Erdogan, San Jose, CA (US); Adam L. Schwartz, San Jose, CA (US)

(73) Assignee: Synaptics Incorporated, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/841,333

(22) Filed: Apr. 6, 2020

(65) Prior Publication Data

US 2020/0233576 A1 Jul. 23, 2020

Related U.S. Application Data

(63) Continuation of application No. 16/024,358, filed on Jun. 29, 2018, now Pat. No. 10,656,827.

(51) Int. Cl.
*G06F 3/041* (2006.01)
*G06F 3/0488* (2013.01)
*G06F 3/0485* (2013.01)
*G06F 3/044* (2006.01)
*G06F 3/0354* (2013.01)
*G06K 9/00* (2006.01)

(52) U.S. Cl.
CPC ...... *G06F 3/04883* (2013.01); *G06F 3/03547* (2013.01); *G06F 3/044* (2013.01); *G06F 3/0485* (2013.01); *G06K 9/0002* (2013.01); *G06F 2203/0338* (2013.01); *G06F 2203/04808* (2013.01)

(58) Field of Classification Search
CPC .. G06F 3/04883; G06F 3/03547; G06F 3/044; G06F 3/0485; G06K 9/0002
See application file for complete search history.

(56) References Cited

U.S. PATENT DOCUMENTS

| | | | |
|---|---|---|---|
| 7,129,926 B2 | 10/2006 | Mathiassen et al. | |
| 7,162,059 B2 | 1/2007 | Yoo et al. | |
| 7,274,808 B2 | 9/2007 | Baharav et al. | |
| 8,260,550 B2 | 9/2012 | Highstrom et al. | |
| 8,277,059 B2 * | 10/2012 | McCabe | B60R 1/088 359/603 |
| 8,344,870 B2 | 1/2013 | Evans et al. | |

(Continued)

*Primary Examiner* — Vijay Shankar
(74) *Attorney, Agent, or Firm* — Leydig, Voit & Mayer, Ltd.

(57) ABSTRACT

A method for performing navigation (NAV) operations using a sensor device comprising a plurality of transmitter electrodes includes: receiving, at an input sensing region of the sensor device, an input object; scanning, by the sensor device, the input object, wherein the scanning comprises driving a first subset of transmitter electrodes for low-resolution scanning and driving a second subset of transmitter electrodes for high-resolution scanning; and determining, by the sensor device, an input object motion based at least in part on the scanning.

18 Claims, 13 Drawing Sheets

(56) References Cited

U.S. PATENT DOCUMENTS

| | | | |
|---|---|---|---|
| 8,506,096 B2* | 8/2013 | McCabe | G02F 1/157 |
| | | | 359/604 |
| 9,067,542 B2* | 6/2015 | Lindahl | G06F 3/044 |
| 9,346,403 B2* | 5/2016 | Uken | G06F 3/0412 |
| 9,367,215 B2* | 6/2016 | Chen | G06F 3/04845 |
| 9,658,727 B2* | 5/2017 | Lindahl | B60R 1/08 |
| 10,538,202 B2* | 1/2020 | McCabe | G02F 1/161 |
| 10,656,827 B2* | 5/2020 | Shen | G06F 3/044 |
| 10,664,115 B2* | 5/2020 | Lindahl | B60R 1/08 |
| 2005/0083310 A1 | 4/2005 | Safai et al. | |
| 2009/0169070 A1 | 7/2009 | Fadell | |
| 2010/0324816 A1 | 12/2010 | Highstrom et al. | |
| 2012/0182242 A1* | 7/2012 | Lindahl | G02F 1/157 |
| | | | 345/173 |
| 2015/0135108 A1 | 5/2015 | Pope et al. | |
| 2017/0073049 A1 | 3/2017 | Schoore | |
| 2020/0285331 A1* | 9/2020 | Lindahl | G06F 3/04842 |

* cited by examiner

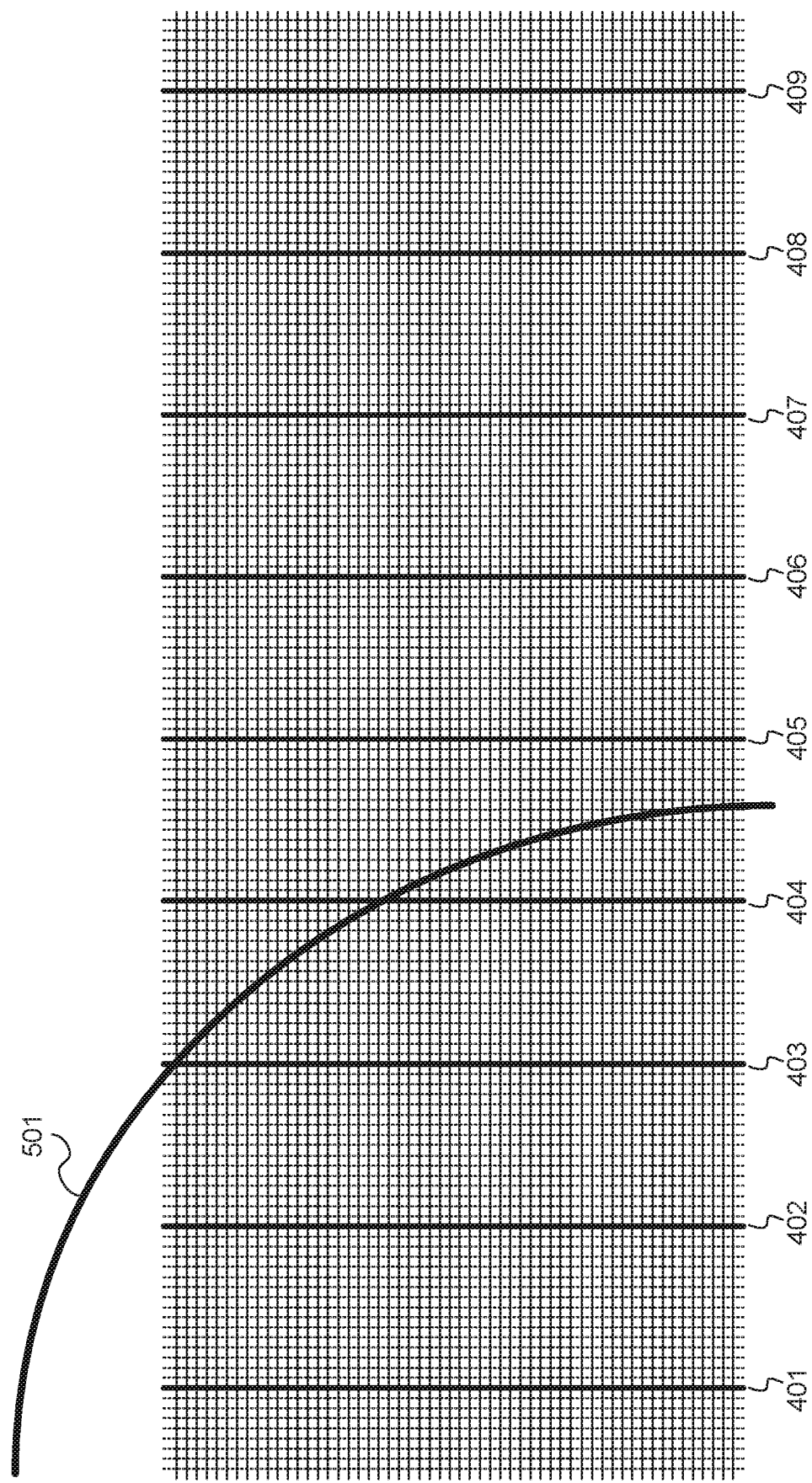

SENSOR DEVICE SCANNING TECHNIQUES TO DETERMINE FAST AND/OR SLOW MOTIONS

CROSS-REFERENCE TO RELATED APPLICATIONS

This patent application is a continuation of copending U.S. patent application Ser. No. 16/024,358, filed Jun. 29, 2018, which is incorporated herein by reference in its entirety.

BACKGROUND

Input devices, including touch sensor devices (also commonly called touchpads or proximity sensor devices), as well as fingerprint sensor devices, are widely used in a variety of electronic systems. Touch sensor devices typically include a sensing region, often demarked by a surface, in which the touch sensor device determines the presence, location and/or motion of one or more input objects, typically for purposes of allowing a user to provide user input to interact with the electronic system. Fingerprint sensor devices also typically include a sensing region in which the fingerprint sensor device determines presence, location, motion, and/or features of a fingerprint or partial fingerprint, typically for purposes relating to user authentication or identification of a user.

Touch sensor devices and fingerprint sensor devices may thus be used to provide interfaces for the electronic system. For example, touch sensor devices and fingerprint sensor devices are often used as input devices for larger computing systems (such as opaque touchpads, touch screens and fingerprint readers integrated in or peripheral to notebook or desktop computers). Touch sensor devices and fingerprint sensor devices are also often used in smaller computing systems (such as touch screens and fingerprint readers integrated in mobile devices such as smartphones and tablets).

Touch sensor devices may be used for navigation (NAV) functions. NAV functions may include, for example, detection of the presence of a finger, as well as detecting gestures based on movement of a finger (such as tapping, double-tapping, scrolling, or swiping gestures). It may also be possible to use fingerprint sensor devices for NAV functions, but fingerprint sensor devices typically have a relatively small input sensing region (e.g., less than 10 mm×10 mm), which makes it impossible or impractical to detect fast-motion gestures such as fast swipe gestures through conventional imaging operations. Further, fingerprint sensor devices may have to contend with low signal-to-noise ratio (SNR) issues when disposed under a relatively thick substrate (such as a glass substrate of thickness 300 μm or greater).

SUMMARY

In an exemplary embodiment, the present disclosure provides a method for performing navigation (NAV) operations using a sensor device comprising a plurality of transmitter electrodes. The method includes: receiving, at an input sensing region of the sensor device, an input object; scanning, by the sensor device, the input object, wherein the scanning comprises driving a first subset of transmitter electrodes for low-resolution scanning and driving a second subset of transmitter electrodes for high-resolution scanning; and determining, by the sensor device, an input object motion based at least in part on the scanning.

In another exemplary embodiment, the present disclosure provides a non-transitory computer-readable medium having processor-executable instructions stored thereon for performing navigation (NAV) operations using a sensor device. The processor-executable instructions, when executed, facilitate performance of the following: scanning, by the sensor device, an input object at an input sensing region of the sensor device, wherein the scanning comprises driving a first subset of transmitter electrodes for low-resolution scanning and driving a second subset of transmitter electrodes for high-resolution scanning; and determining, by the sensor device, an input object motion based at least in part on the scanning.

In yet another exemplary embodiment, the present disclosure provides a method for performing navigation (NAV) operations using a fingerprint sensor device. The method includes: receiving, at an input sensing region of the fingerprint sensor device, a finger; scanning, by the fingerprint sensor device, the fingerprint, wherein the scanning comprises driving a first subset of transmitter electrodes of the fingerprint sensor device to determine finger coverage via one or more low-resolution scans; and detecting, by the fingerprint sensor device, based on the scanning, a finger motion corresponding to a NAV operation.

BRIEF DESCRIPTION OF THE DRAWINGS

FIG. 5A shows an example of a first scan being taken while a finger is located on the left side of the exemplary orthogonal grid of transmitter electrodes and receiver electrodes from FIG. 3.

DETAILED DESCRIPTION

Figure 1:
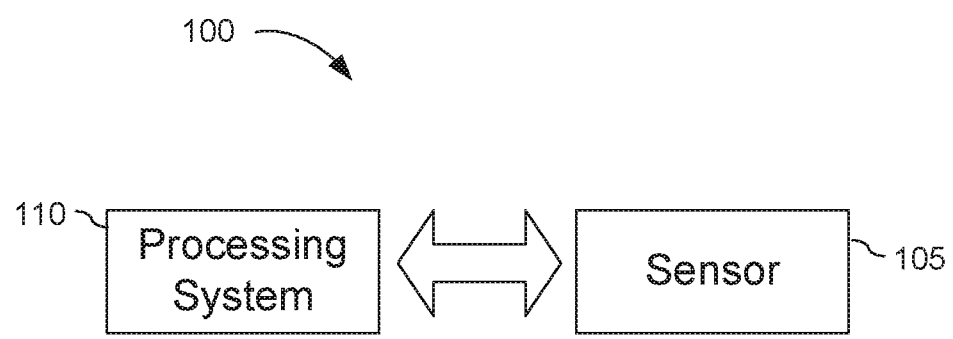
FIG. 1 is a block diagram depicting an exemplary input device.

The following detailed description is exemplary in nature and is not intended to limit the disclosure or the application and uses of the disclosure. Furthermore, there is no intention to be bound by any expressed or implied theory presented in the preceding background, summary and brief description of the drawings, or the following detailed description.

Fingerprint sensor devices may utilize transcapacitive sensing techniques in connection with a plurality of transmitter (TX) and receiver (RX) electrodes. Such fingerprint sensors may include an array of TX electrodes and receiver RX electrodes. The array may be configured in various different ways, for example, in a bars-and-stripes pattern, in single-layer configurations with interdigitated electrodes, in matrix configurations where each pixel corresponds to an electrode plate, in orthogonal diamond configurations, etc. When a finger is placed onto the fingerprint sensor device, the TX electrodes are driven, and the RX electrodes are configured to detect different capacitance values corresponding to ridges and valleys of the fingerprint, thereby providing an image of the fingerprint (or part of the fingerprint) corresponding to the finger.

Since the signal level detected at the RX electrodes may be low, for example when the fingerprint sensor device is disposed under a thick glass substrate upon which the finger is placed, techniques may be used to enhance the signal level. For example, code division multiplexing (CDM) may be used with respect to transmitter signals driven onto the TX electrodes. The CDM order, corresponding to the amount of TX electrodes being simultaneously driven, may be equivalent to the total number of TX electrodes such that all TX electrodes are simultaneously driven for a plurality of sub-steps of a scan. Thus, a higher signal level is provided by CDM since multiple TX electrodes can be driven at a time, relative to a non-CDM driving scheme where a single TX electrode is driven at a time.

Transcapacitive fingerprint sensor devices may conventionally be used for NAV operations corresponding to relatively slow finger motions. For example, a slow finger gesture corresponding to a slow scroll operation (e.g., where a user may be trying to slowly scroll up or down a webpage or a document on a screen, or where a user may be trying to slowly move a cursor or pointer or a view on a screen) may move as slowly as, for example, a few millimeters per second. These types of slow motions may be detected by fully imaging the input sensing region multiple times, and detecting the slow scroll operation based on the movement of features of the fingerprint that can be seen across multiple captured images.

However, transcapacitive fingerprint sensor devices are not conventionally used for NAV operations corresponding to relatively fast finger motions. For example, a fast finger gesture corresponding to a swipe operation (e.g., where a user may be trying to quickly scroll up or down a webpage or a document on a screen, where a user may be trying to swipe left or swipe right to get to a previous or next page on a screen, where a user may be trying to use a pull-down menu, or where a user may be trying to flip between images in a photo album), may move as quickly as, for example, 50 centimeters per second. These types of fast motions cannot be reliably detected by fully imaging the input sensing region, as the fast motion may cause the features of the fingerprint (e.g., ridge/valley information) to become blurred, or the fast motion may be completed before multiple images of the input sensing region can be captured.

Exemplary systems and methods discussed herein provide scanning techniques for fingerprint sensor devices enabling NAV operations corresponding to relatively fast finger motions, such as detecting a fast swipe NAV operations. Exemplary systems and methods discussed herein further provide for hybrid scanning techniques such that a fingerprint sensor device may be operated in a manner that simultaneously looks for slow and fast finger motions. These exemplary systems and methods provide various advantages, for example, with respect to improving frame rate, reducing computation complexity and power consumption, improving NAV accuracy, and providing a solution that simultaneously looks for slow and fast finger motions.

FIG. 1 is a block diagram depicting an example input device 100 within which the present embodiments may be implemented. The input device 100 may be configured to provide input to an electronic system (not shown for simplicity). As used in this document, the term "electronic system" (or "electronic device") broadly refers to any system capable of electronically processing information. Examples of electronic systems include personal computing devices (e.g., desktop computers, laptop computers, netbook computers, tablets, web browsers, e-book readers, and personal digital assistants (PDAs)), wearable computers (e.g., smart watches and activity tracker devices), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). Additionally, the electronic system may be a host or a slave to the input device 100.

The input device 100 may be implemented as a physical part of the electronic system, or may be physically separate from the electronic system. The input device 100 may be coupled to (and communicate with) components of the electronic system using wired or wireless interconnections and communication technologies, such as buses and networks. Example technologies may include Inter-Integrated Circuit (I2C), Serial Peripheral Interface (SPI), Personal System/2 (PS/2), Universal Serial Bus (USB), Bluetooth®, Infrared Data Association (IRDA), and various radio frequency (RF) communication protocols defined by the IEEE 802.11 or other standards.

In the example of FIG. 1, input device 100 includes a sensor 105. The sensor 105 comprises one or more sensing elements configured to sense input provided by one or more input objects in a sensing region of the input device 100. Examples of input objects include fingers, styli, and hands. The sensing region may encompass any space above, around, in, and/or proximate to the sensor 105 in which the input device 100 is able to detect user input (e.g., user input provided by one or more input objects). The sizes, shapes, and/or locations of particular sensing regions (e.g., relative to the electronic system) may vary depending on actual implementations. In some embodiments, the sensing region may extend from a surface of the input device 100 in one or more directions into space, for example, until a signal-to-noise ratio (SNR) of the sensors fall below a threshold suitable for accurate object detection. For example, the distance to which this sensing region extends in a particular direction may be on the order of less than a millimeter, millimeters, centimeters, or more, and may vary significantly with the type of sensing technology used and/or the accuracy desired. In some embodiments, the sensor 105 may detect input involving no physical contact with any surfaces of the input device 100, contact with an input surface (e.g., a touch surface and/or screen) of the input device 100, contact with an input surface of the input device 100 coupled with some amount of applied force or pressure, and/or a combination thereof. In various embodiments, input surfaces may be provided by surfaces of sensor substrates within which or on which sensor elements are positioned, or by face sheets or other cover layers positioned over sensor elements.

The input device 100 comprises one or more sensing elements for detecting user input. Some implementations utilize arrays or other regular or irregular patterns of sensing elements to detect the input object. The input device 100 may utilize different combinations of sensor components and sensing technologies to detect user input in the sensing region.

The input device 100 may utilize various sensing technologies to detect user input. Example sensing technologies may include capacitive, elastive, resistive, inductive, magnetic, acoustic, ultrasonic, and optical sensing technologies. In some embodiments, the input device 100 may utilize capacitive sensing technologies to detect user inputs. For example, the sensing region may include one or more capacitive sensing elements (e.g., sensor electrodes) to create an electric field. The input device 100 may detect inputs based on changes in capacitance of the sensor electrodes. For example, an object in contact with (or close proximity to) the electric field may cause changes in the voltage and/or current in the sensor electrodes. Such changes in voltage and/or current may be detected as "signals" indicative of user input.

The sensor elements may be arranged in arrays (regular or irregular patterns) or other configurations to detect inputs. In some implementations, separate sensing elements may be ohmically shorted together to form larger sensor electrodes. Some capacitive sensing implementations may utilize resistive sheets that provide a uniform resistance.

Example capacitive sensing technologies may be based on "self-capacitance" (also referred to as "absolute capacitance") and/or "mutual capacitance" (also referred to as "transcapacitance"). Transcapacitance sensing methods detect changes in the capacitive coupling between sensor electrodes. For example, an input object near the sensor electrodes may alter the electric field between the sensor electrodes, thus changing the measured capacitive coupling of the sensor electrodes. In some embodiments, the input device 100 may implement transcapacitance sensing by detecting the capacitive coupling between one or more transmitter sensor electrodes (also "transmitter electrodes" or "drive electrodes") and one or more receiver sensor electrodes (also "receiver electrodes" or "pickup electrodes"). For example, transmitter sensor electrodes may be modulated relative to a reference voltage to transmit transmitter signals while receiver sensor electrodes may be held at a relatively constant voltage to receive the transmitted signals. The reference voltage may be, for example, a substantially constant voltage or system ground. In some embodiments, transmitter sensor electrodes and receiver sensor electrodes may both be modulated. The signals received by the receiver sensor electrodes may be affected by environmental interference (e.g., from other electromagnetic signals and/or objects in contact with, or in close proximity to, the sensor electrodes). Sensor electrodes may be dedicated transmitters or receivers, or may be configured to both transmit and receive.

In some implementations, the input device 100 is configured to provide images that span one, two, three, or higher dimensional spaces. The input device 100 may have a sensor resolution that varies from embodiment to embodiment depending on factors such as the particular sensing technology involved and/or the scale of information of interest. In some embodiments, the sensor resolution is determined by the physical arrangement of an array of sensing elements, where smaller sensing elements and/or a smaller pitch can be used to define a higher sensor resolution.

The input device 100 may be implemented as a fingerprint sensor having a sensor resolution high enough to capture discriminative features of a fingerprint. In some implementations, the fingerprint sensor has a resolution sufficient to capture minutia (including ridge endings and bifurcations), orientation fields (sometimes referred to as "ridge flows"), and/or ridge skeletons. These are sometimes referred to as level 1 and level 2 features, and in an exemplary embodiment, a resolution of at least 250 pixels per inch (ppi) is capable of reliably capturing these features. In some implementations, the fingerprint sensor has a resolution sufficient to capture higher level features, such as sweat pores or edge contours (i.e., shapes of the edges of individual ridges). These are sometimes referred to as level 3 features, and in an exemplary embodiment, a resolution of at least 750 pixels per inch (ppi) is capable of reliably capturing these higher level features.

In some embodiments, a fingerprint sensor is implemented as a placement sensor (also "area" sensor or "static" sensor) or a swipe sensor (also "slide" sensor or "sweep" sensor). In a placement sensor implementation, the sensor is configured to capture a fingerprint input as the user's finger is held stationary over the sensing region. Typically, the placement sensor includes a two dimensional array of sensing elements capable of capturing a desired area of the fingerprint in a single frame. In a swipe sensor implementation, the sensor is configured to capture a fingerprint input based on relative movement between the user's finger and the sensing region. In some embodiments, the swipe sensor may include a linear array or a thin two-dimensional array of sensing elements configured to capture multiple frames as the user's finger is swiped or moves over the sensing region. The multiple frames may then be reconstructed to form an image of the fingerprint corresponding to the fingerprint input. In some implementations, the sensor is configured to capture both placement and swipe inputs.

In some embodiments, a fingerprint sensor is configured to capture less than a full area of a user's fingerprint in a single user input (referred to herein as a "partial" fingerprint sensor). Typically, the resulting partial area of the fingerprint captured by the partial fingerprint sensor is sufficient for the system to perform fingerprint matching from a single user input of the fingerprint (e.g., a single finger placement or a single finger swipe). Some exemplary imaging areas for partial placement sensors include an imaging area of 100 $mm^2$ or less. In another exemplary embodiment, a partial placement sensor has an imaging area in the range of 20-50 $mm^2$. In some implementations, the partial fingerprint sensor has an input surface that is of the same or substantially the same size as the imaging area.

In FIG. 1, a processing system 110 is included with the input device 100. The processing system 110 may comprise parts of or all of one or more integrated circuits (ICs) and/or other circuitry components. The processing system 110 is coupled to the sensor 105, and is configured to operate hardware of the input device 100 (e.g., sensing hardware of the sensor 105) to detect input in the sensing region.

The processing system 110 may include driver circuitry configured to drive sensing signals with sensing hardware of the input device 100 and/or receiver circuitry configured to receive resulting signals with the sensing hardware. For example, processing system 100 may be configured to drive transmitter signals onto transmitter sensor electrodes of the sensor 105, and/or receive resulting signals detected via receiver sensor electrodes of the sensor 105.

The processing system 110 may include a non-transitory computer-readable medium having processor-executable instructions (such as firmware code, software code, and/or the like) stored thereon. The processing system 110 can be implemented as a physical part of the sensor 105, or can be physically separate from the sensor 105. Also, constituent components of the processing system 110 may be located together, or may be located physically separate from each other. For example, the input device 100 may be a peripheral device coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a main processor of the mobile device. The processing system 110 may be dedicated to implementing the input device 100, or may perform other functions, such as operating display screens, driving haptic actuators, etc.

The processing system 110 may operate the sensing element(s) of the sensor 105 of the input device 100 to produce electrical signals indicative of input (or lack of input) in a sensing region. The processing system 110 may perform any appropriate amount of processing on the electrical signals to translate or generate the information provided to the electronic system. For example, the processing system 110 may digitize analog electrical signals received via the sensor electrodes and/or perform filtering or conditioning on the received signals. In some embodiments, the processing system 110 may subtract or otherwise account for a baseline associated with the sensor electrodes. For example, the baseline may represent a state of the sensor electrode when no user input is detected. Accordingly, the information provided by the processing system 110 to the electronic system may reflect a difference between the signals received from the sensor electrodes and a baseline associated with each sensor electrode. As yet further examples, the processing system 110 may determine positional information, recognize inputs as commands, recognize handwriting, match biometric samples, and the like.

In some embodiments, the input device 100 may include a touch screen interface (e.g., display screen), as well as a fingerprint sensor, wherein a sensing region of the fingerprint sensor at least partially overlaps a sensing region of the touch screen interface. The display device may be any suitable type of dynamic display capable of displaying a visual interface to a user, including an inorganic light-emitting diode (LED) display, organic LED (OLED) display, cathode ray tube (CRT), liquid crystal display (LCD), plasma display, electroluminescence (EL) display, or other display technology. The display may be flexible or rigid, and may be flat, curved, or have other geometries. The display may include a glass or plastic substrate for thin-film transistor (TFT) circuitry, which may be used to address display pixels for providing visual information and/or providing other functionality. The display device may include a cover lens (sometimes referred to as a "cover glass") disposed above display circuitry and above inner layers of the display module, and the cover lens may also provide an input surface for the input device 100. Examples of cover lens materials include optically clear amorphous solids, such as chemically hardened glass, and optically clear crystalline structures, such as sapphire. The input device 100 and the display device may share physical elements. For example, some of the same electrical components may be utilized for both displaying visual information and for input sensing with the input device 100, such as using one or more display electrodes for both display updating and input sensing. As another example, the display screen may be operated in part or in total by the processing system 110 in communication with the input device 100.

Figure 2:
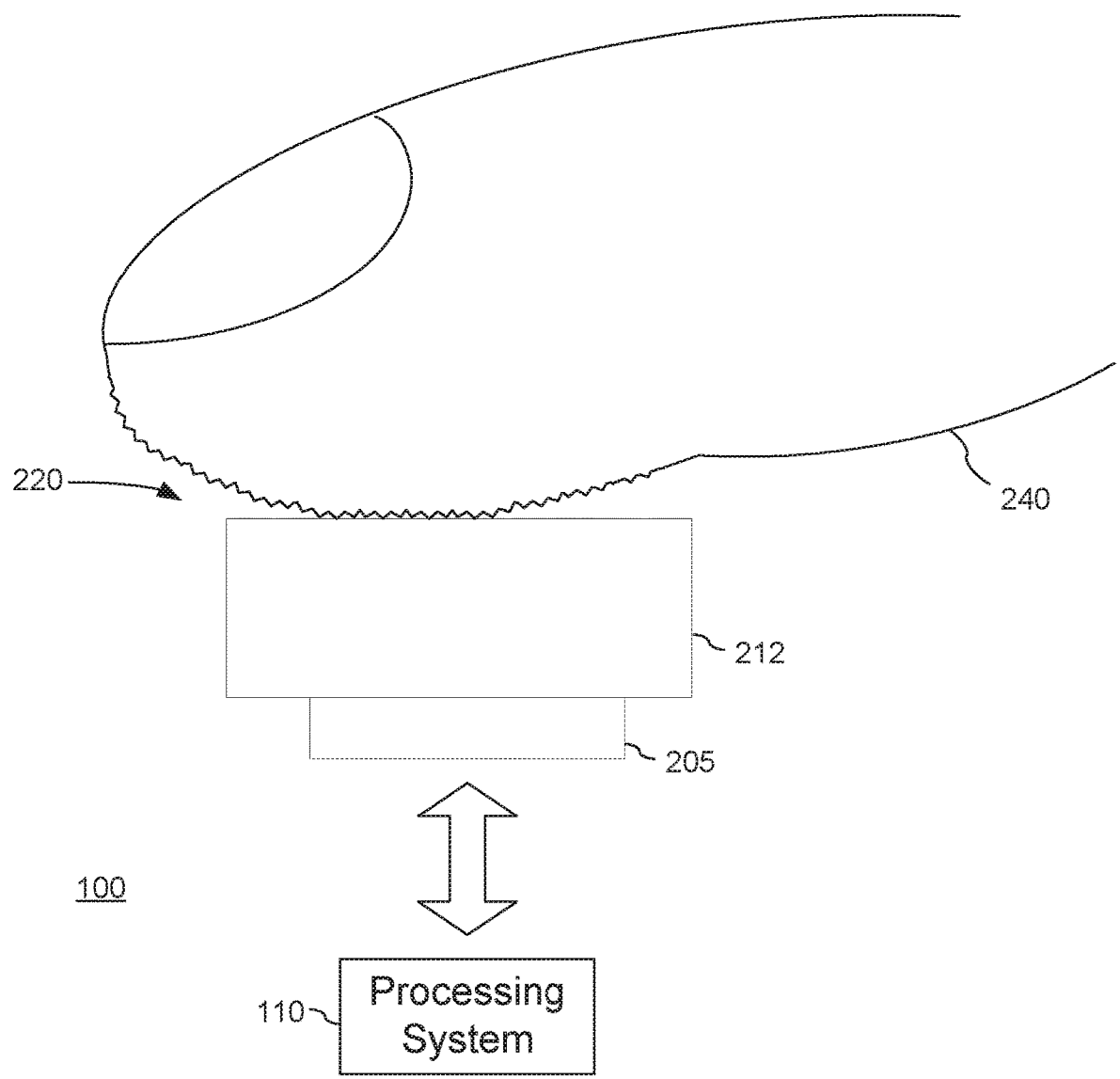
FIG. 2 is a block diagram depicting a further exemplary input device.

FIG. 2 is a block diagram depicting the input device 100 as including a fingerprint sensor 205. The fingerprint sensor 205 is configured to capture an image of the fingerprint from a finger 240. The fingerprint sensor 205 is disposed underneath a cover layer 212 that provides an input surface for the fingerprint to be placed on or swiped over the fingerprint sensor 205. The sensing region 220 may include an input surface with an area larger than, smaller than, or similar in size to a full fingerprint. The fingerprint sensor 205 has an array of sensing elements with a resolution configured to detect surface variations of the finger 240. In certain embodiments, the fingerprint sensor 205 may be disposed within the active area of a display.

Figure 3:
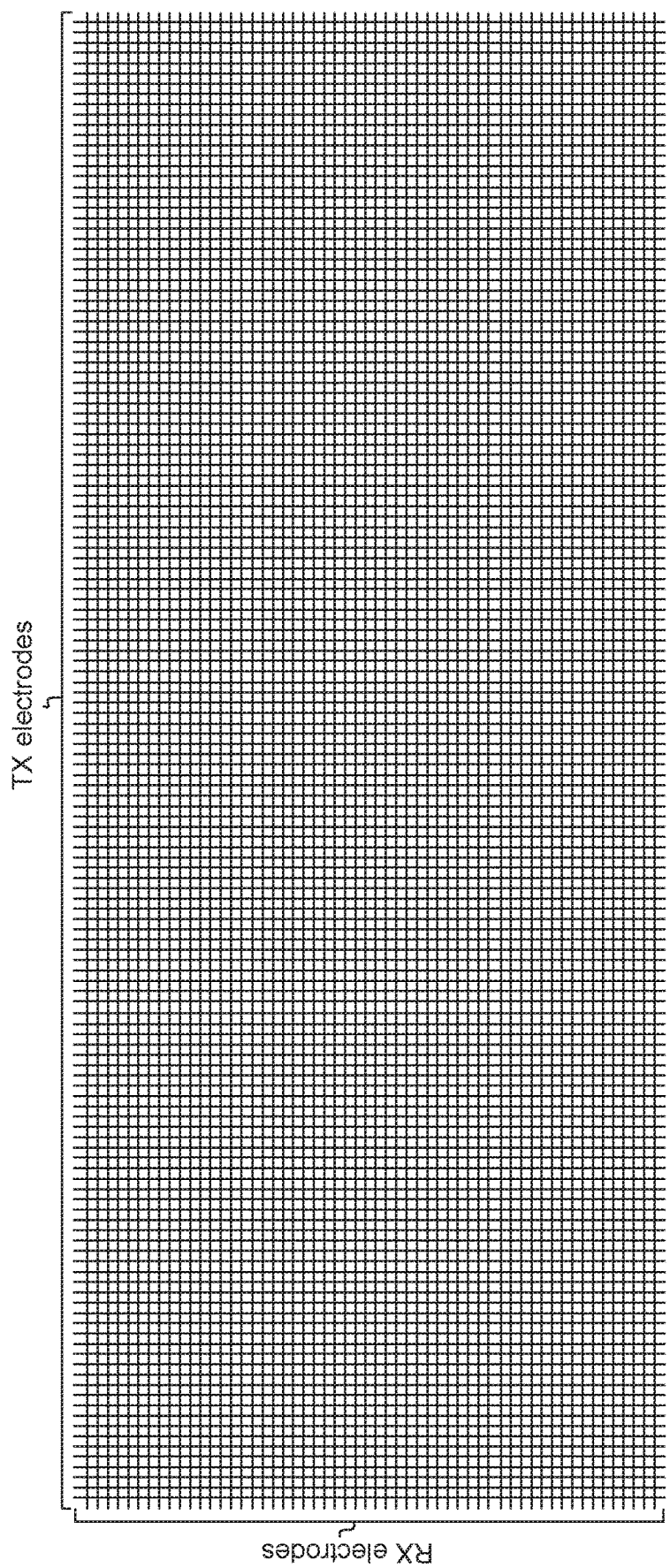
FIG. 3 depicts an exemplary orthogonal grid of transmitter electrodes and receiver electrodes of a fingerprint sensor device.

FIG. 3 depicts an exemplary orthogonal grid of transmitter electrodes and receiver electrodes of a fingerprint sensor device (e.g., fingerprint sensor 205). It will be appreciated that this example, which depicts a 56×144 array (56 RX electrodes and 144 TX electrodes) is merely illustrative, and that other configurations may be used as well, including, for example, 56×96, 80×80, 88×116, 72×80, etc. It will further be appreciated that although a grid with transmitter electrodes and receiver electrodes orthogonal to one another in a bars and stripes configuration is used herein as an example, other exemplary implementations of a fingerprint sensor device may utilize other configurations of transmitter electrodes and receiver electrodes—including, for example, single-layer configurations with interdigitated electrodes, matrix configurations where each pixel corresponds to an electrode plate, orthogonal diamond configurations, etc.

Figure 4:
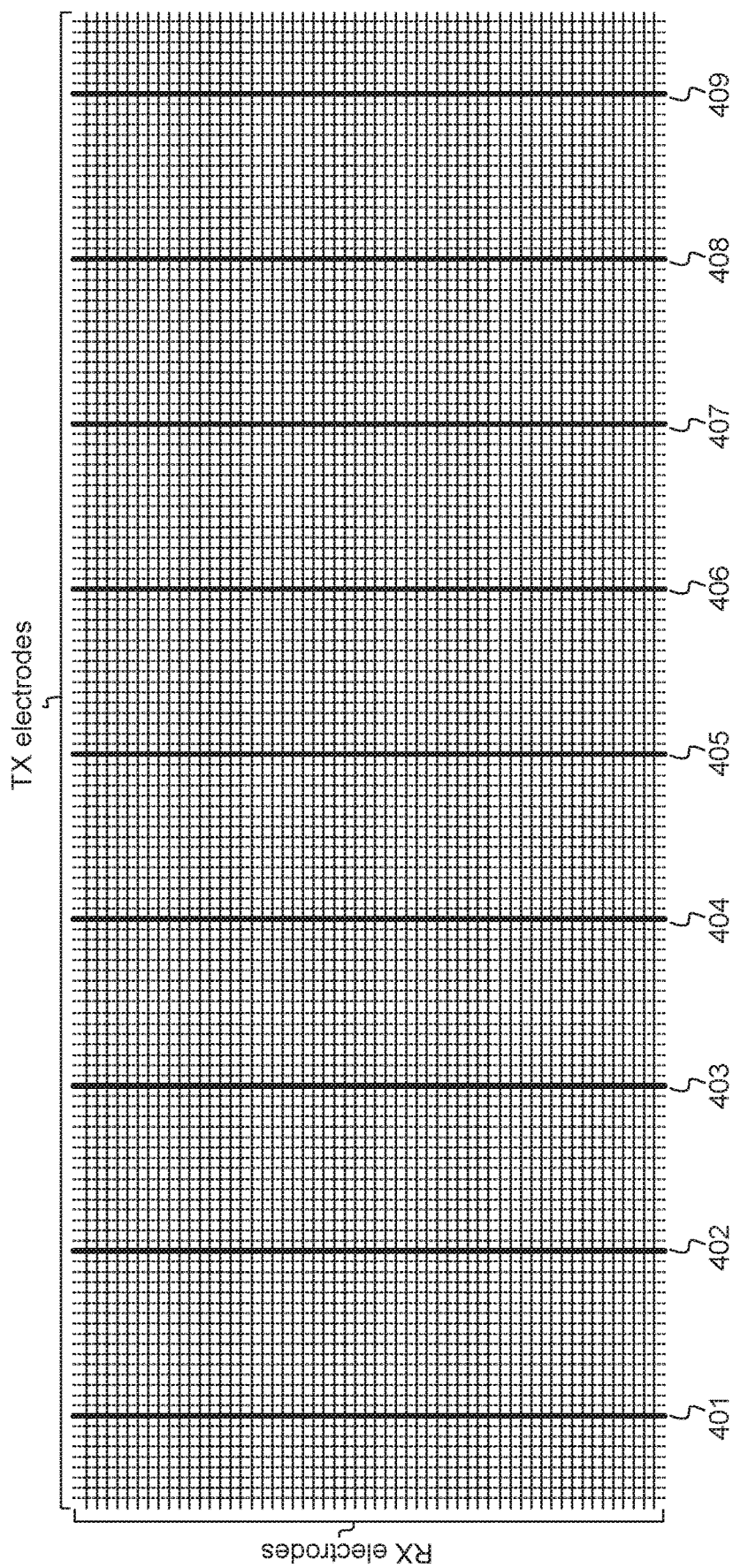
FIG. 4 depicts the exemplary orthogonal grid of transmitter electrodes and receiver electrodes from FIG. 3 with a subset of transmitter electrodes being driven for a low-resolution scan.

FIG. 4 depicts the exemplary orthogonal grid of transmitter electrodes and receiver electrodes from FIG. 3 with a subset of transmitter electrodes being driven for a low-resolution scan (the active transmitter electrodes are shown with a solid line, whereas the inactive transmitter electrodes are shown with a dotted line). In this example, nine TX electrodes 401-409 of the 144 TX electrodes are driven to determine whether or not a fingerprint is present proximate to each of the nine TX electrodes, and these nine TX electrodes 401-409 are distributed over the input sensing region. It will be appreciated that in other examples, a different number and/or a different distribution of TX electrodes may be used.

To detect a fast finger motion, such as a fast swipe motion from left-to-right, a plurality of low-resolution scans to determine finger presence is performed. It will be appreciated that CDM may or may not be used for these low-resolution finger presence scans (but even if CDM is used, decoding is not needed for identifying finger presence). If CDM is not used, each scan may include nine sub-steps, with each sub-step corresponding to a respective electrode out of the nine TX electrodes 401-409 being driven. If CDM is used, each scan may still include nine sub-steps, with each sub-step corresponding to all nine TX electrodes 401-409 being driven (e.g., using a 9×9 drive matrix for CDM9).

Figure 5B:
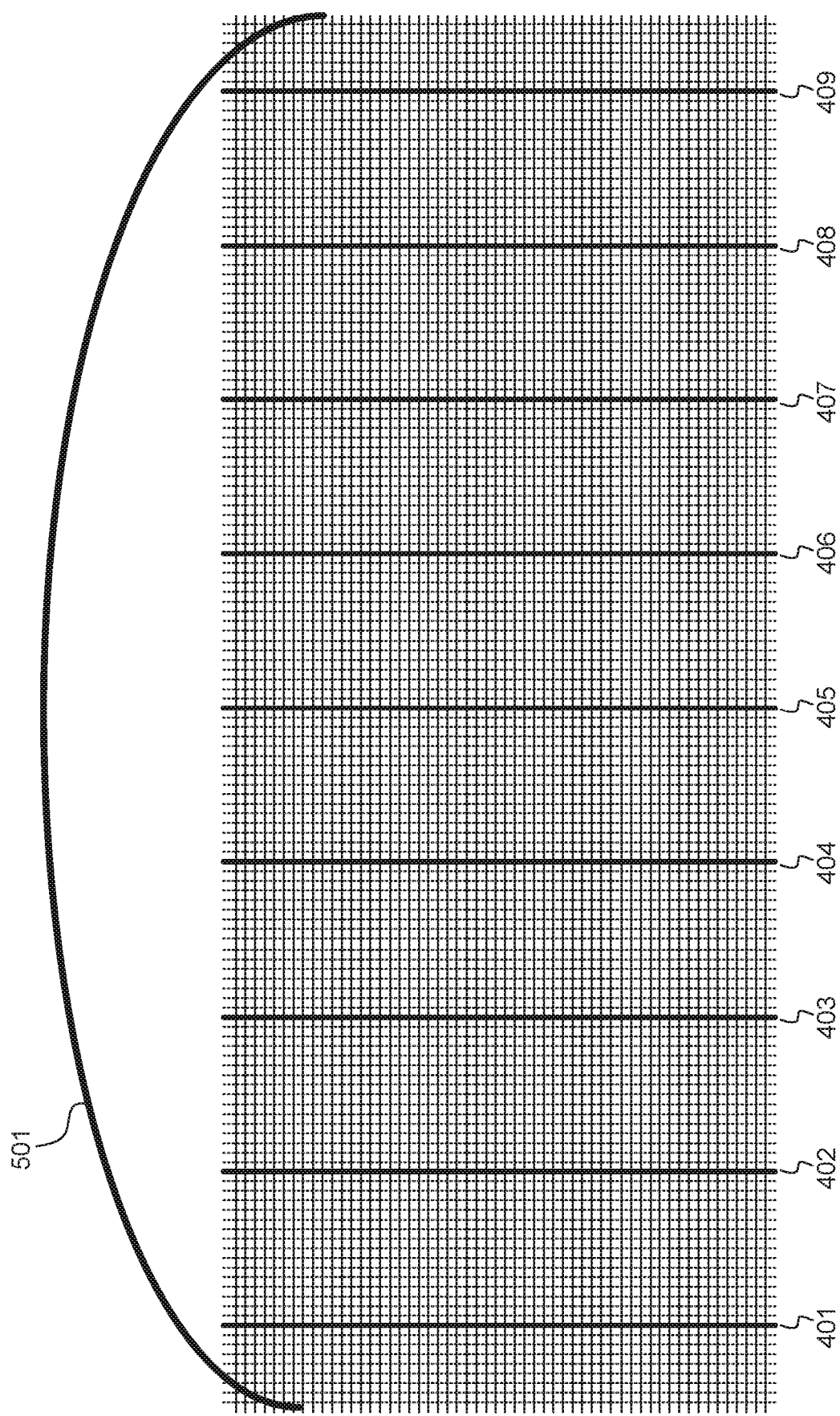
FIG. 5B shows an example of a second scan being performed while a finger is located over the entirety of the exemplary orthogonal grid of transmitter electrodes and receiver electrodes from FIG. 3.
Figure 5C:
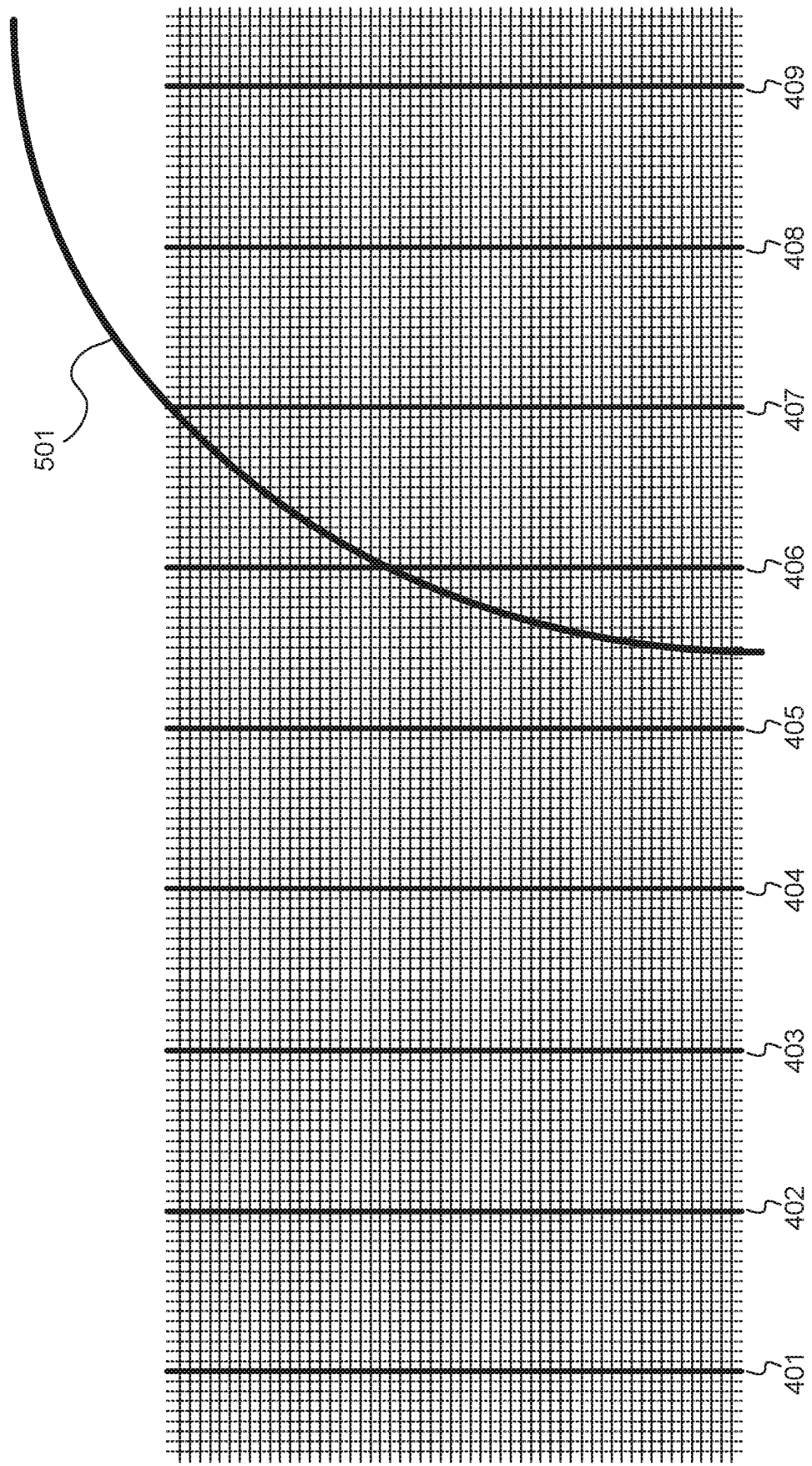
FIG. 5C shows an example of a third scan being taken while a finger is located on the right side of the exemplary orthogonal grid of transmitter electrodes and receiver electrodes from FIG. 3.

FIGS. 5A-5C illustrates a series of exemplary scans being performed as a finger moves from left to right. FIG. 5A shows an example of a first scan being performed while a finger is located on the left side of the exemplary orthogonal grid of transmitter electrodes and receiver electrodes from FIG. 3. During this first scan, the corresponding fingerprint sensor device is able to determine that the finger 501 is present over TX electrodes 401-404 and is not present over TX electrodes 405-409. In this situation, the measured values at the RX electrodes for the first through fourth sub-steps (corresponding to TX electrodes 401-404 being driven, respectively) is different from the measured values at the RX electrodes for the fifth through ninth sub-steps (corresponding to TX electrodes 405-409 being driven, respectively). The measured values at the RX electrodes for the first through fourth sub-steps indicate that a finger is present proximate to TX electrodes 401-404, for example, based on comparing the measured capacitance values to a first threshold. The measured values at the RX electrodes for the fifth through ninth sub-steps indicate that a finger is not present proximate to TX electrodes 405-409, for example, based on comparing the measured capacitance values to a second threshold (which may or may not be the same as the first threshold).

FIG. 5B shows an example of a second scan being performed while a finger is located over the entirety of the exemplary orthogonal grid of transmitter electrodes and receiver electrodes from FIG. 3. During this second scan, the corresponding fingerprint sensor device is able to determine that the finger 501 is present over all of TX electrodes 401-409.

FIG. 5C shows an example of a third scan being taken while a finger is located on the right side of the exemplary orthogonal grid of transmitter electrodes and receiver electrodes from FIG. 3. During this third scan, the corresponding fingerprint sensor device is able to determine that the finger 501 is present over TX electrodes 406-409 and is not present over TX electrodes 401-405.

Because each low-resolution scan includes only a small subset of TX electrodes being driven, and because the processing system is merely determining where the finger is present for each scan (rather than obtaining a full image of the input sensing region for each scan), a plurality of low-resolution scans can be performed very quickly and with low processing times. Thus, even if there is very fast finger motion (e.g., up to 50 centimeters per second or up to even greater speeds) where the finger passes through the three positions shown in FIGS. 5A-5C very quickly, the fingerprint sensor device is able to keep up and acquire a series of scans which indicate that a fast finger motion has occurred. For example, based on three scans corresponding to each of FIGS. 5A-5C, a processing system of a fingerprint sensor device is able to determine that a fast swipe gesture from left-to-right has occurred (e.g., based on determining that the finger was first present at the left side of the sensing region, then present at the middle of the sensing region, then present at the right side of the sensing region, over a short time interval).

Further, it will be appreciated that scanning this small subset of electrodes (e.g., 9 electrodes out of 144 electrodes) can be performed extremely quickly, and the framerate may be faster than necessary even for detecting fast finger motions. Thus, the fingerprint sensor device may include a waiting period between low-resolution scans (e.g., at $1/10^{th}$ duty cycle) to reduce power consumption while still allowing for detection of fast finger motions.

FIGS. 5A-5C provide an example of a fast swipe motion in a horizontal direction. In other exemplary embodiments, a fast swipe motion in a vertical direction may also be detected. For example, in the case of a vertical swipe in a downwards direction, the input sensing region may start off as being completely covered by the finger, followed by the top-most receiver lines becoming uncovered first, followed by additional receiver lines becoming uncovered as the swipe continues. When the top-most receiver lines become uncovered, the capacitance detected by those receiver lines increases. As more and more receiver lines become uncovered, a ripple response is detected where capacitance increases from top to bottom for a downwards swipe. Thus, based on detecting this ripple response from top to bottom, a downwards vertical swipe can be determined. Similarly, based on detecting a ripple response from bottom to top, an upwards vertical swipe can be determined.

Figure 6:
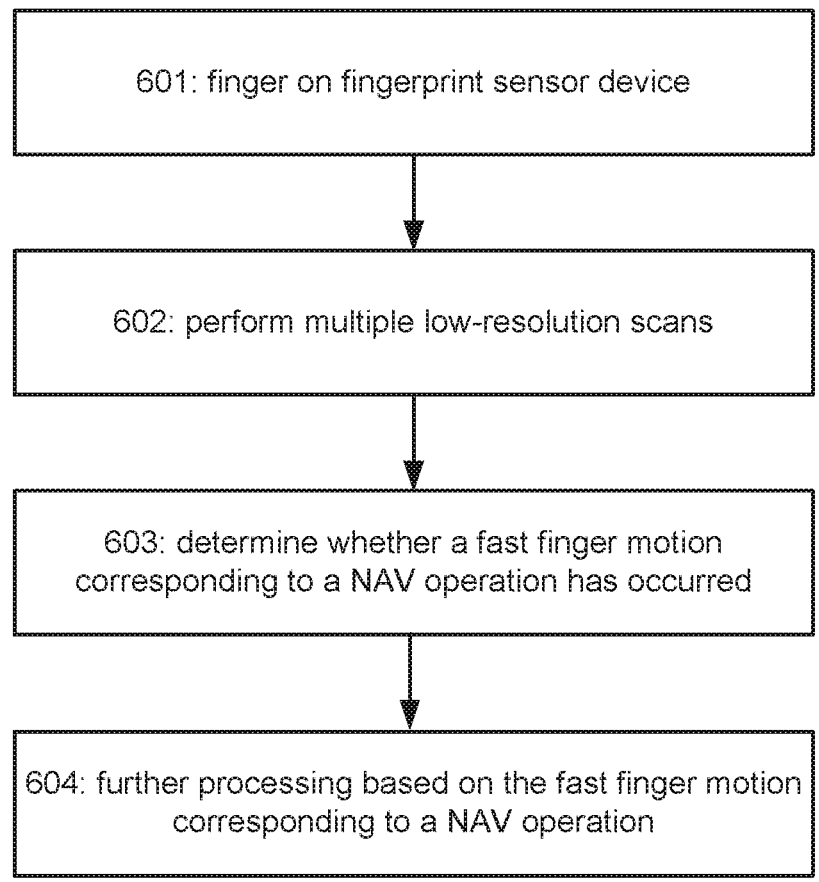
FIG. 6 is a flowchart depicting a process for using a fingerprint sensor device to perform NAV operations corresponding to fast finger motions.

FIG. 6 is a flowchart depicting a process for using a fingerprint sensor device to perform NAV operations corresponding to fast finger motions. The process starts at stage 601 with a finger on a sensing surface of a fingerprint sensor device. For example, a finger may be received at an input sensing region of the fingerprint sensor device, and the fingerprint sensor device may determine to initiate scanning, for example, based on a wake-on-finger (WOF) process. At stage 602, multiple low-resolution scans (for example, low-resolution scans using a subset of TX electrodes as discussed above with respect to FIGS. 5A-5C) are performed. At stage 603, a processing system of the fingerprint sensor device determines whether a fast finger motion, such as a fast swipe, has occurred based on the multiple low-resolution scans. Stage 603, may include, for example, analyzing changes in finger presence relative to the input sensing region of the fingerprint sensor device across different low-resolution scans within a certain period of time and determining whether there has been a fast swipe of the finger, for example, from left to right or right to left or upwards or downwards. At stage 604, further processing may be performed based on the determination that a fast finger motion corresponding to a NAV operation has occurred. For example, if the fast finger motion was a fast swipe from right to left, the fingerprint sensor device may cause a displayed website, application, or document to advance to a next page.

Thus, it will be appreciated that by using a subset of TX electrodes for low-resolution scans based on finger presence, a fingerprint sensor device may be used for NAV operations corresponding to fast finger motions. Further, low-resolution scans may be performed with relatively low power consumption and low computational complexity, and at very high frame rates. Moreover, utilizing low-resolution scans based on finger presence may be more accurate than conventional full-resolution scans with respect to certain NAV operations, particularly where the NAV operation includes situations where the finger is only partially covering the sensing region (full-resolution scans sometimes do not perform well under partial-coverage conditions) or where the finger motion is fast (full-resolution scans are susceptible to blurring if the speed of the finger motion is above a certain threshold).

In certain exemplary embodiments, each TX electrode of the subset of TX electrodes used for the low-resolution scans is adjacent to at least one TX electrode that is not used for the low-resolution scan.

In certain exemplary embodiments, the TX electrodes of the subset of TX electrodes used for low-resolution scans may be distributed throughout the sensing region. In one example, the TX electrodes used for low-resolution scans may be evenly distributed (i.e., each pair of consecutive active TX electrodes has a same number of inactive TX electrodes between them). In other examples, the TX electrodes used for the low-resolution scans may not be evenly distributed (e.g., having different numbers of inactive TX electrodes between each pair of consecutive active TX electrodes), so long as there is at least one active TX electrode in each of a plurality of regions of interest. For example, if the input sensing region is divided into just two regions of interest, there should be at least one active TX electrode on one side, and at least one active TX electrode on the other side. In another example, if the input sensing region is divided into three regions of interest, there should be at least one active TX electrode in a center region, at least one active TX electrode in a region on one side of the center region, and at least one active TX in a region on the other side of the center region.

In further exemplary embodiments, small groups of multiple adjacent TX electrodes (such as two adjacent TX electrodes) distributed throughout the sensing region may be used for the low-resolution scanning.

Figure 7:
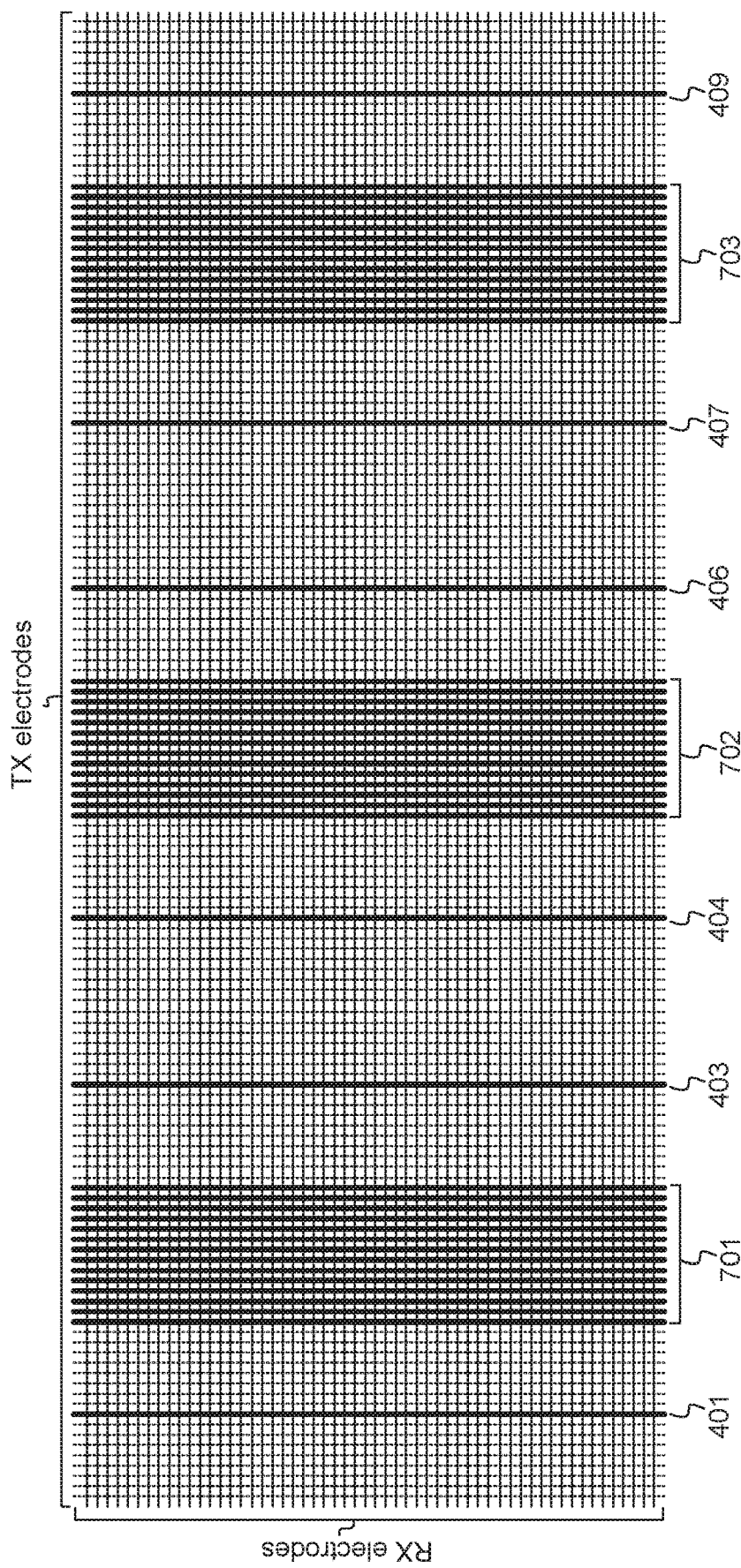
FIG. 7 depicts the exemplary orthogonal grid of transmitter electrodes and receiver electrodes from FIG. 3 with a subset of transmitter electrodes being driven for a hybrid low-resolution/full-resolution scan.

FIG. 7 depicts the exemplary orthogonal grid of transmitter electrodes and receiver electrodes from FIG. 3 with a subset of transmitter electrodes being driven for a hybrid low-resolution/full-resolution scan (the active transmitter electrodes are shown with a solid line, whereas the inactive transmitter electrodes are shown with a dotted line). In this example, a first subset—six of the TX electrodes 401, 403, 404, 406, 407, 409 of the 144 TX electrodes—as well as a second subset—three full-resolution sub-regions 701, 702, 703 of 14 adjacent TX electrodes each—are driven. The six TX electrodes 401, 403, 404, 406, 407, 409 are used for low-resolution scanning to determine whether or not a finger is present proximate to each of those six TX electrodes, whereas the three full-resolution sub-regions 701, 702, 703 are used to provide a full-resolution sub-image corresponding to each respective sub-region. In a further exemplary embodiment, the TX electrodes in the sub-regions 701, 702, 703 may also contribute to the low-resolution scanning—for example, by activating all of the TX electrodes in each particular sub-region simultaneously and treating each sub-region as if it were a single electrode for the purposes of the low-resolution scanning. It will be appreciated that in other examples, a different number of TX electrodes may be used for low-resolution scanning (to determine whether or not a finger is present proximate to each TX electrode), a different number of full-resolution sub-regions may be used, a different number of adjacent TX electrodes per full-resolution sub-region may be used, and/or a different distribution of TX electrodes or full-resolution sub-regions may be used. For example, two full-resolution sub-regions may be used, one full-resolution sub-region may be used, four full-resolution sub-regions may be used, etc.

The subset of TX electrodes depicted as being driven in FIG. 7 includes both a first subset of TX electrodes being used at a low-resolution for finger presence detection and a second subset of TX electrodes (comprising three regions of adjacent TX electrodes) being used for capturing full-resolution sub-images of the sensing region. The fingerprint sensor device is thus able to provide scanning with different resolutions corresponding to different parts of the input sensing region, such that both finger coverage information and fingerprint sub-images are obtained to enable NAV operations corresponding to fast finger motions and slow finger motions (e.g., the finger coverage information may be used for detecting fast swipe motions and the partial fingerprint images may be used for detecting slow scroll motions).

In the example shown in FIG. 7, each scan may include 48 sub-steps, with 6 sub-steps corresponding to TX electrodes 401, 403, 404, 406, 407, 409 (either being driven one at a time without CDM or being driven simultaneously with CDM) to determine whether or not a finger is present proximate to each TX electrode and with 14 sub-steps corresponding to each full-resolution sub-region 701, 702, 703. Each full-resolution sub-region may be scanned at full resolution using, for example, CDM order 14 (CDM14) where each set of 14 adjacent TX electrodes are driven at the same time to increase the SNR for the full-resolution sub-region scanning. In another example corresponding to FIG. 7, each scan may include 51 sub-steps, with 9 sub-steps corresponding to TX electrodes and sub-regions 401, 701, 403, 404, 702, 406, 407, 703, 409 (with each sub-region 701, 702, 703 being driven as if it were a single TX electrode) to determine whether or not a finger is present proximate to each TX electrode/sub-region and with 14 sub-steps corresponding to each full-resolution sub-region 701, 702, 703. In yet another example, instead of each sub-region 701, 702, 703 being driven as if it were a single TX electrode for the low-resolution scanning, a subset of one or more TX electrodes from each sub-region 701, 702, 703 may be used for the low-resolution scanning.

The scanning configuration shown in FIG. 7 is thus able to detect both fast finger motions (such as fast swipe motions) and slow finger motions (such as slow scroll motions) based on a plurality of scans. The 6 TX electrodes 401, 403, 404, 406, 407, 409 (plus, optionally, the three sub-regions 701, 702, 703 or a subset thereof being operated as 3 additional low-resolution electrodes) may be used for low-resolution scanning based on whether or not a finger is present, and the fingerprint sensor device is able to perform fast finger motion NAV operations based on these 6 TX electrodes (plus the three sub-regions 701, 702, 703 or a subset thereof) in a similar manner as discussed above with respect to FIGS. 3-6. The full-resolution sub-regions 701, 702, 703 are used to perform full-resolution imaging over those sub-regions, and the fingerprint sensor device is able to perform slow finger motion NAV operations based on analyzing the motion of fingerprint features (e.g., movement of ridges and/or valleys) across multiple scans.

It will be appreciated that since this hybrid scanning technique utilizes full-resolution sub-regions (corresponding to subsets of the TX electrodes of the fingerprint sensor) to determine slow finger motions rather than using full-image scanning (which utilizes all TX electrodes of the fingerprint sensor), slow finger motion NAV operations may be accomplished by this hybrid scanning technique at lower power and lower computational complexity relative to conventional fingerprint sensors which rely on full-image scanning to perform slow finger motion NAV operations.

It will be appreciated that the full-resolution sub-regions are not required to be "full resolution" in the sense that all TX electrodes of the sub-region are directly adjacent to one another. Instead, the sub-regions may be "high-resolution" sub-regions, which may or may not be full-resolution sub-regions. For example, a high-resolution sub-region may include 14 TX electrodes that are not immediately adjacent but are still relatively close together to provide a relatively high resolution sub-image (e.g., each active TX electrode of the high-resolution sub-region may be separated from a next active TX electrode of the high-resolution by having one or two inactive TX electrodes between them).

Figure 8:
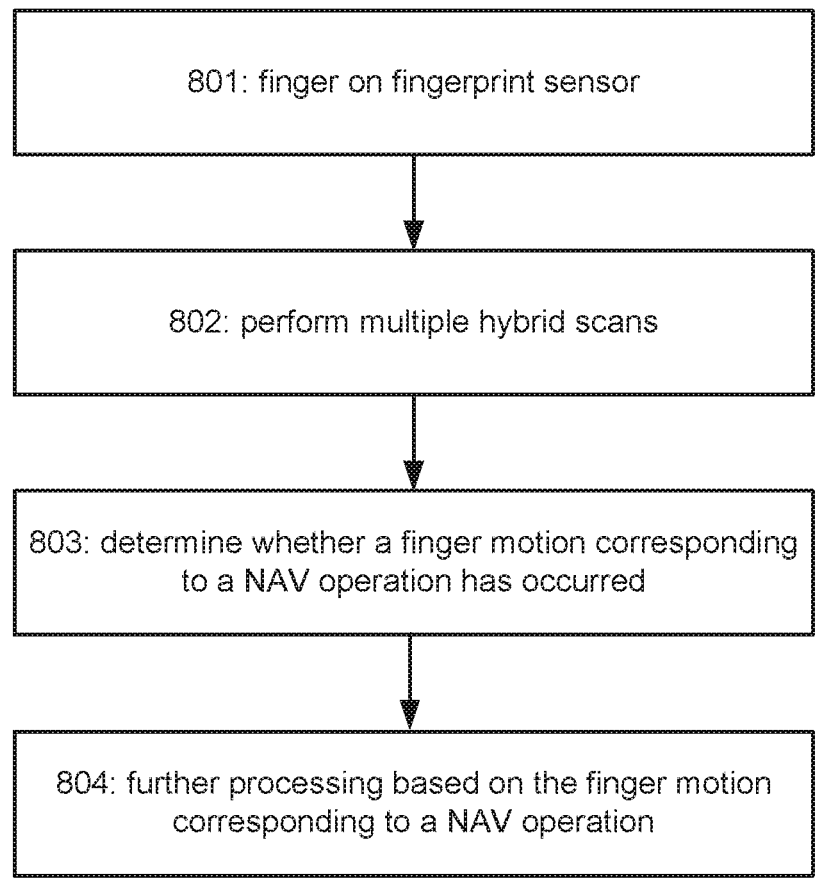
FIG. 8 is a flowchart depicting a process for using a fingerprint sensor device to perform NAV operations corresponding to slow and/or fast finger motions.

FIG. 8 is a flowchart depicting a process for using a fingerprint sensor device to perform NAV operations corresponding to slow and/or fast finger motions. The process starts at stage 801 with a finger on a sensing surface of a fingerprint sensor device. For example, a finger may be received at an input sensing region of the fingerprint sensor device, and the fingerprint sensor device may determine to initiate scanning, for example, based on a wake-on-finger (WOF) process. At stage 802, multiple hybrid scans (for example, hybrid scans using a subset of TX electrodes similar to the hybrid scans discussed above with respect to FIG. 7) are performed. At stage 803, a processing system of the fingerprint sensor device determines whether a finger motion, which may be a fast finger motion such as a fast swiping motion or a slow finger motion such as a slow scrolling motion, has occurred based on the multiple hybrid scans.

Stage 803, may include, for example, analyzing changes in finger presence relative to the input sensing region of the fingerprint sensor device across different scans (based on spaced-out TX electrodes 401, 403, 404, 406, 407, 409 which are used to determine finger presence) within a certain period of time and determining whether there has been a fast-swipe movement of the finger, for example, from left to right or right to left or upwards or downwards. Stage 803 may also include, for example, analyzing captured full-resolution (or high-resolution) sub-images corresponding to one or more of the sub-regions 701, 702, 703 corresponding to 14 adjacent TX electrodes and determining whether there has been a slow scroll movement of the finger, for example, upwards, downwards, to the left, or to the right.

Analyzing the captured sub-images of a particular sub-region may include correlating ridges present in one sub-image to ridges present in another sub-image to determine whether or not there is movement of the ridges. Since the sub-image size (e.g., 56×14) is smaller than the full input sensing region, the correlation processing is relatively fast. Using even smaller sub-images (such as using less than all RX electrodes—e.g., 14×14) may increase the processing speed even further.

Stage 803 may further include determination of finger speed based on the movement of fingerprint features between two or more scans (as determined by comparing captured sub-images), such that different actions may be taken at stage 804 based on different NAV operations corresponding to different determined speeds.

At stage 804, further processing may be performed based on the determination that a finger motion corresponding to a NAV operation has occurred. For example, if the fast finger motion was a fast swipe from right to left, the fingerprint sensor device may cause a displayed website, application, or document to advance to a next page or to quickly scroll to the right (and the speed of the scroll may be based on the speed of the motion). In another example, if a slow finger motion was a slow scroll upwards, the fingerprint sensor device may cause a displayed website, application, or document to gradually scroll downwards (and the speed of the scroll may be based on the speed of the motion). In other examples, if there is no motion detected, the fingerprint sensor device may determine that there has been a tap, a double-tap, or a long press.

Thus, it will be appreciated that by using a subset of TX electrodes for a hybrid scan (including using certain TX electrodes for determination of finger presence and other TX electrodes for capturing full-resolution sub-images), a fingerprint sensor device may be used for NAV operations corresponding to both fast finger motions and slow finger motions. Further, the hybrid scans may be performed with relatively low power consumption and low computational complexity and at relatively high frame rates (relative to fully scanning the input sensing region). Moreover, utilizing hybrid scans (which include using certain TX electrodes for determination of finger presence) may be more accurate than conventional full-resolution scans with respect to certain NAV operations, particularly where the NAV operation includes situations where the finger is only partially covering the sensing region (full-resolution scans sometimes do not perform well under partial-coverage conditions) or where the finger motion is fast (full-resolution scans are susceptible to blurring if the speed of the finger motion is above a certain threshold).

Figure 9:
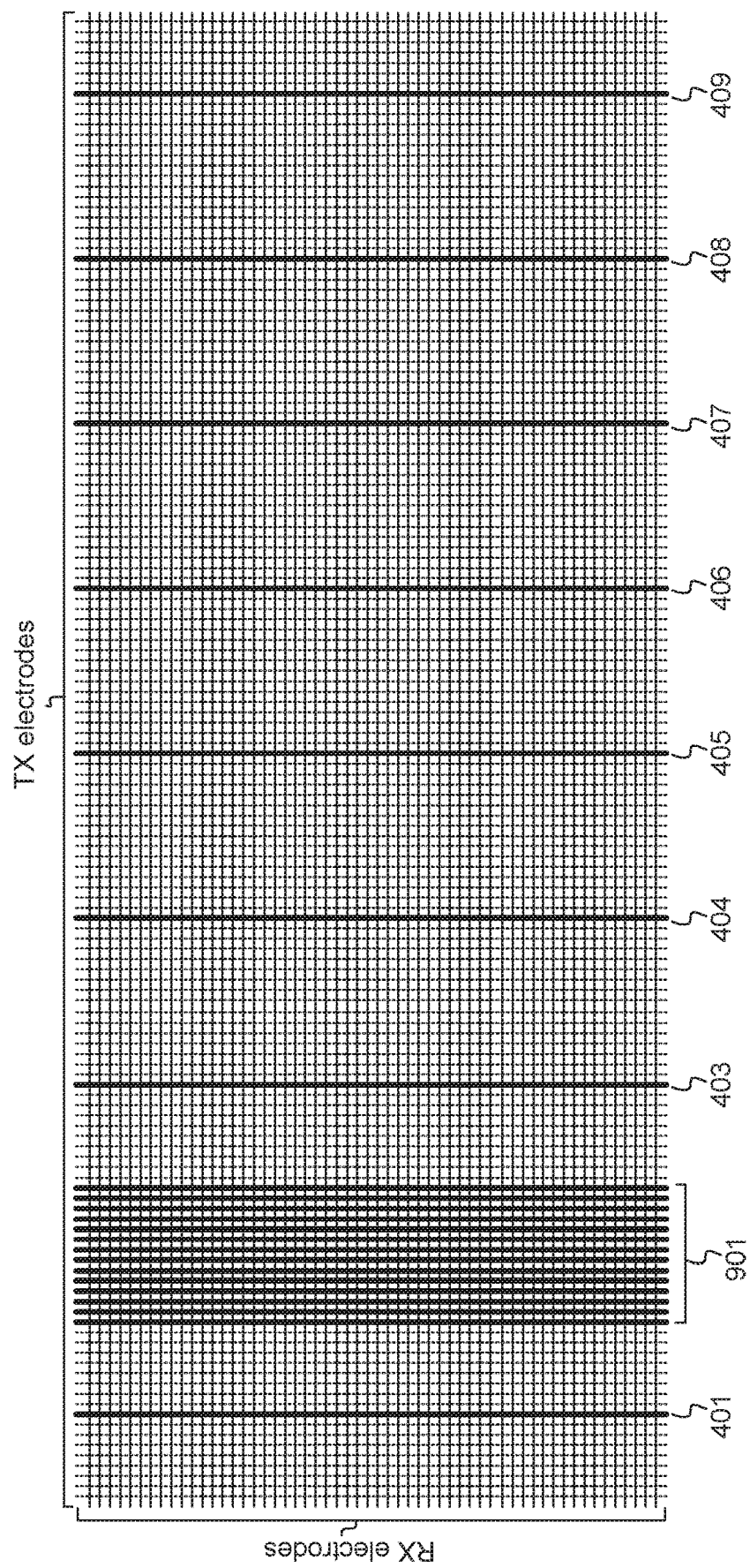
FIG. 9 depicts the exemplary orthogonal grid of transmitter electrodes and receiver electrodes from FIG. 3 with a subset of transmitter electrodes being driven for an abbreviated hybrid low-resolution/full-resolution scan.

FIG. 9 depicts the exemplary orthogonal grid of transmitter electrodes and receiver electrodes from FIG. 3 with a subset of transmitter electrodes being driven for an abbreviated hybrid low-resolution/full-resolution scan (the active transmitter electrodes are shown with a solid line, whereas the inactive transmitter electrodes are shown with a dotted line). The abbreviated hybrid scan is similar to the hybrid scan shown in FIG. 7, except that it provides less full-resolution sub-images because less full-resolution sub-regions of 14 adjacent TX electrodes are used. In the example shown in FIG. 9, only one sub-region 901 of 14 adjacent TX electrodes is used.

In the example shown in FIG. 9, each scan may include 20 sub-steps, with 6 sub-steps corresponding to TX electrodes 401, 403, 404, 406, 407, 409 (either being driven one at a time without CDM or being driven simultaneously with CDM) to determine whether or not a finger is present proximate to each TX electrode and with 14 sub-steps corresponding to the full-resolution sub-region 901. The full-resolution sub-region may be scanned at full-resolution using, for example, CDM order 14 (CDM14) where the 14 adjacent TX electrodes are driven at the same time to increase the SNR for the full-resolution sub-region scanning.

It will thus be appreciated that the abbreviated hybrid scan corresponding to FIG. 9 may be performed more quickly, with less complexity, and with less power than the hybrid scan corresponding to FIG. 7. In certain examples, hybrid scanning was performed at a framerate of 500-1000 at an acceptable SNR level, while abbreviated hybrid scanning was performed at a framerate of more than 3000 fps at an acceptable SNR level.

In certain exemplary embodiments, the one or more full-resolution sub-regions used for successive abbreviated hybrid scans may change based on finger coverage of the input sensing region changing (e.g., in a first abbreviated hybrid scan, only the full-resolution sub-region 701 may be used, but based on the finger moving, only the full-resolution sub-region 702 may be used in a later abbreviated hybrid scan).

Figure 10:
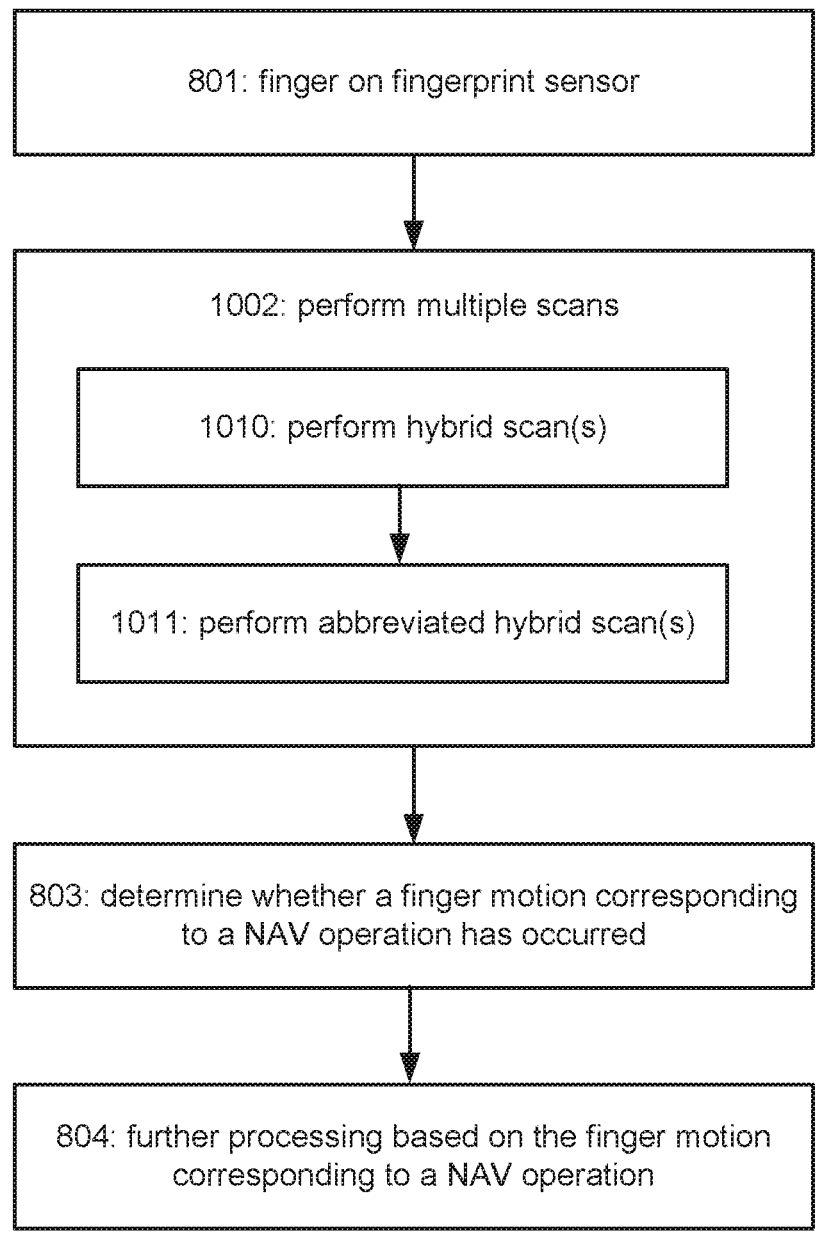
FIG. 10 is a flowchart depicting a process for using a fingerprint sensor device to perform NAV operations corresponding to slow and/or fast finger motions.

FIG. 10 is a flowchart depicting a process for using a fingerprint sensor device to perform NAV operations corresponding to slow and/or fast finger motions. FIG. 10 is similar to FIG. 8, except that stage 802 is replaced with stage 1002, i.e., instead of performing only hybrid scans, the process shown in FIG. 10 includes performing both one or more hybrid scans and one or more abbreviated hybrid scans.

In one exemplary "double scan" embodiment, performing scanning at stage 1002 includes performing multiple double scans, wherein each double scan includes performing a hybrid scan followed by an abbreviated hybrid scan, wherein one or more full-resolution sub-regions for the abbreviated hybrid scan is selected based on the finger coverage determined from the respective preceding hybrid scan. For example, of the three sub-regions 701, 702, 703 shown in FIG. 7, sub-region 701 may be selected for the abbreviated hybrid scan (e.g., as shown in FIG. 9) if the finger is determined as being present in sub-region 701 and not present in sub-regions 702 and 703. The fingerprint sensor device may utilize an adjustable waiting period between double scans to achieve a desired framerate and/or a desired amount of power consumption.

In another exemplary embodiment, performing scanning at stage 1002 includes performing a hybrid scan followed by multiple abbreviated hybrid scans, wherein the one or more full-resolution sub-regions for the multiple abbreviated hybrid scans is selected based on the hybrid scan. The fingerprint sensor device may also utilize an adjustable waiting period between scans in this embodiment to achieve a desired framerate and/or a desired amount of power consumption. In one example, a single hybrid scan is performed followed by only abbreviated hybrid scans being performed thereafter until a stop condition is met (e.g., an amount of time elapsing, the finger moving to a different full-resolution sub-region, detecting that the finger has left the sensor, etc.). In another example, the hybrid scans are performed periodically with multiple abbreviated hybrid scans being performed between two hybrid scans.

Figure 11:
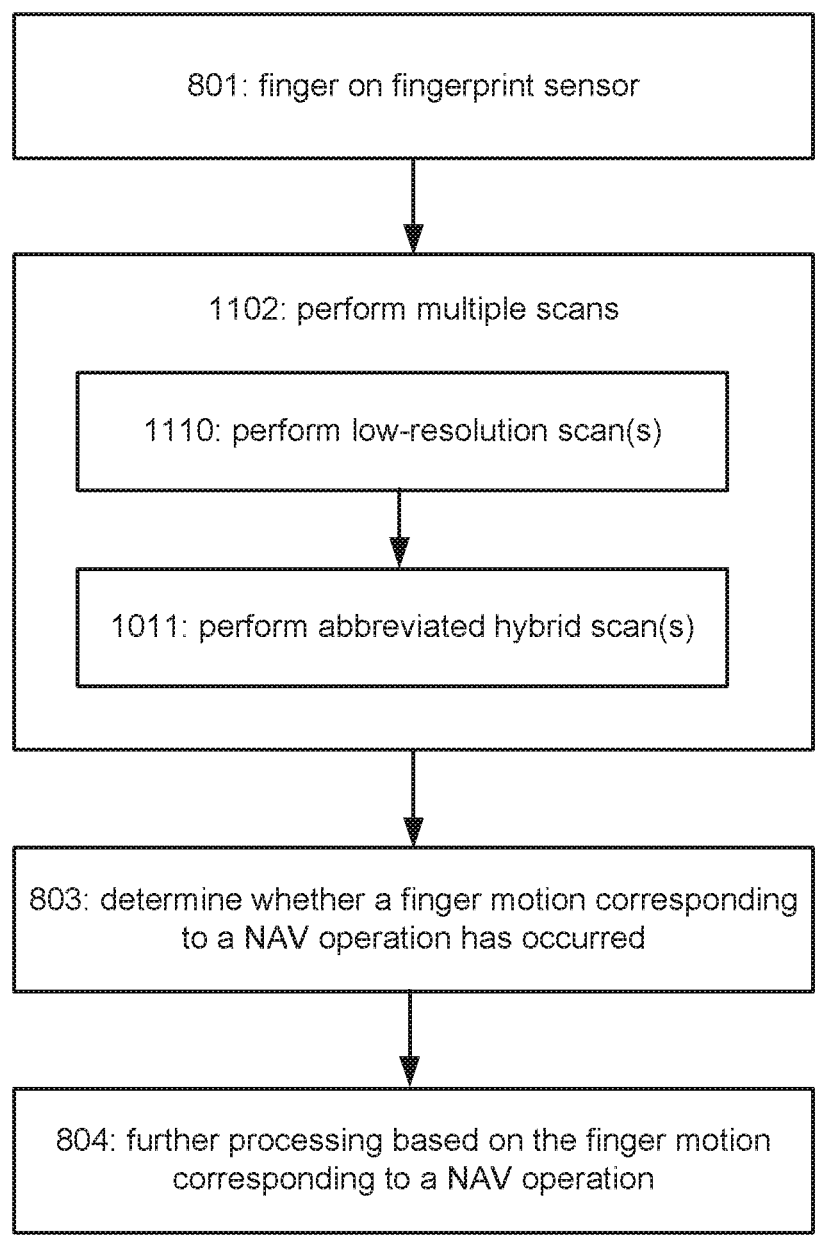
FIG. 11 is a flowchart depicting a process for using a fingerprint sensor device to perform NAV operations corresponding to slow and/or fast finger motions.

FIG. 11 is a flowchart depicting a process for using a fingerprint sensor device to perform NAV operations corresponding to slow and/or fast finger motions. FIG. 11 is similar to FIG. 10, except that stage 1002 is replaced with stage 1102—i.e., instead of performing hybrid scans and abbreviated hybrid scans, the process shown in FIG. 11 includes performing both one or more low-resolution scans and one or more abbreviated hybrid scans.

In one exemplary "double scan" embodiment, performing scanning at stage 1102 includes performing multiple double scans, where each double scan includes performing a low-resolution scan followed by an abbreviated hybrid scan, wherein one or more full-resolution sub-regions for the abbreviated hybrid scan is selected based on the finger coverage determined from the respective preceding hybrid scan. For example, based on a low-resolution coverage scan as shown in FIG. 3, sub-region 901 may be selected for the abbreviated hybrid scan (e.g., as shown in FIG. 9) if the finger is determined as being present in that sub-region and not in other sub-regions. The fingerprint sensor device may utilize an adjustable waiting period between double scans to achieve a desired framerate and/or a desired amount of power consumption.

In another exemplary embodiment, performing scanning at stage 1102 includes performing a low-resolution scan followed by multiple abbreviated hybrid scans, wherein the one or more full-resolution sub-regions for the multiple abbreviated hybrid scans is selected based on the low-resolution scan. The fingerprint sensor device may also utilize an adjustable waiting period between scans in this embodiment to achieve a desired framerate and/or a desired amount of power consumption. In one example, a single low-resolution scan is performed followed by only abbreviated hybrid scans being performed thereafter until a stop condition is met (e.g., an amount of time elapsing, the finger moving to a different full-resolution sub-region, detecting that the finger has left the sensor, etc.). In another example, the low-resolution scans are performed periodically with multiple abbreviated hybrid scans being performed between two low-resolution scans.

In yet another exemplary embodiment, performing scanning may include performing multiple low-resolution scans and determining whether or not a fast finger motion is in progress, and if it is determined that a fast finger motion is in progress, no hybrid scans and no abbreviated hybrid scans are performed. Rather, the fingerprint sensor continues to just perform low-resolution scans (since the higher level of detail provided by hybrid scans and abbreviated hybrid scans would not be needed to evaluate the fast finger motion that is in progress).

It will be appreciated that although the illustrative examples discussed above are provided in the context of transcapacitive fingerprint sensor devices, the principles described herein may also be applied to other types of input devices, such as fingerprint sensors using absolute capacitance sensing techniques, as well as optical fingerprint sensors. For example, in an absolute capacitance fingerprint sensor, less than all of the electrodes may be used to carry out fast scanning and/or hybrid scanning as described herein. Similarly, in an optical fingerprint sensor, less than all of the pixels may be used to carry out fast scanning and/or hybrid scanning as described herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for performing navigation (NAV) operations using a sensor device comprising a plurality of transmitter electrodes, the method comprising:
    receiving, at an input sensing region of the sensor device, an input object;
    scanning, by the sensor device, the input object, wherein the scanning comprises driving a first subset of transmitter electrodes for low-resolution scanning and a second subset of transmitter electrodes for high-resolution scanning; and
    determining, by the sensor device, an input object motion based at least in part on the scanning;
    wherein the scanning further comprises:
        determining input object coverage based at least in part on the low-resolution scanning; and
        capturing a sub-image of the input object based at least in part on the high-resolution scanning.

2. The method according to claim 1, wherein the second subset of transmitter electrodes for high-resolution scanning includes one or more groups of adjacent transmitter electrodes.

3. The method according to claim 1, wherein the first subset of transmitter electrodes for low-resolution scanning includes transmitter electrodes distributed throughout the input sensing region.

4. The method according to claim 1, wherein one or more electrodes of the second subset of transmitter electrodes for high-resolution scanning are also part of the first subset of transmitter electrodes for low-resolution scanning.

5. The method according to claim 1, wherein determining the input object motion comprises determining a fast swipe NAV motion based on the low-resolution scanning.

6. The method according to claim 1, wherein determining the input object motion comprises determining a slow scroll NAV motion based on the high-resolution scanning.

7. The method according to claim 1, wherein the input object is a finger.

8. The method according to claim 1, wherein the input object is a stylus.

9. The method according to claim 1, wherein the input object is a hand.

10. A non-transitory computer-readable medium having processor-executable instructions stored thereon for performing navigation (NAV) operations using a sensor device, the processor-executable instructions, when executed, facilitating performance of the following:
    scanning, by the sensor device, an input object at an input sensing region of the sensor device, wherein the scanning comprises driving a first subset of transmitter electrodes for low-resolution scanning and a second subset of transmitter electrodes for high-resolution scanning; and
    determining, by the sensor device, an input object motion based at least in part on the scanning;
    wherein the scanning further comprises:
        determining input object coverage based at least in part on the low-resolution scanning; and
        capturing a sub-image of the input object based at least in part on the high-resolution scanning.

11. The non-transitory computer-readable medium according to claim 10, wherein the second subset of transmitter electrodes for high-resolution scanning includes one or more groups of adjacent transmitter electrodes.

12. The non-transitory computer-readable medium according to claim 10, wherein the first subset of transmitter electrodes for low-resolution scanning includes transmitter electrodes distributed throughout the input sensing region.

13. The non-transitory computer-readable medium according to claim 10, wherein determining the input object motion comprises determining a fast swipe NAV motion based on the low-resolution scanning.

14. The non-transitory computer-readable medium according to claim 10, wherein determining the input object motion comprises determining a slow scroll NAV motion based on the high-resolution scanning.

15. The non-transitory computer-readable medium according to claim 10, wherein the input object is a finger.

16. The non-transitory computer-readable medium according to claim 10, wherein the input object is a stylus.

17. The non-transitory computer-readable medium according to claim 10, wherein the input object is a hand.

18. A method for performing navigation (NAV) operations using a sensor device, the method comprising:
    receiving, at an input sensing region of the sensor device, an input object;
    scanning, by the sensor device, the input object, wherein the scanning comprises driving a first subset of transmitter electrodes of the sensor device to determine coverage of the input sensing region by the input object through multiple low-resolution scans; and
    detecting, by the sensor device, based on the scanning, motion of the input object corresponding to a fast swipe NAV operation.

* * * * *